Sept. 30, 1969   G. LEYGUE ET AL   3,469,830
FEELER DEVICE FOR IRON PRODUCTS SCARFING
Filed Sept. 25, 1967   2 Sheets-Sheet 1

INVENTORS
GUY LEYGUE
JACQUES AUBERGER
By Young & Thompson
ATTYS.

United States Patent Office 3,469,830
Patented Sept. 30, 1969

3,469,830
FEELER DEVICE FOR IRON PRODUCTS SCARFING
Guy Leygue, Parthenay, and Jacques, Auberger, Le Tallud, France, assignors to L'Air Liquide, Societe Anonyme pour l'Etude et l'Exploitation des Procedes Georges Claude, Paris, France
Filed Sept. 25, 1967, Ser. No. 670,073
Claims priority, application France, Sept. 28, 1966, 77,974
Int. Cl. B23k 7/06, 7/10
U.S. Cl. 266—23
7 Claims

ABSTRACT OF THE DISCLOSURE

Apparatus for controlling the height of a deseaming torch (23) above a metal product (1) to be treated. A fluid operated jack (10) decreases the force with which the feeler member (20, 21) bears on the product. The operating chamber (24) is connected either to a first source of fluid (35) for lifting the torch and the feeler member or to a lower pressure second source of fluid (26) for only relieving the action of the feeler member upon the product.

---

This invention relates to an apparatus for use in the treatment of the surface of partly-finished products with a torch, for example for deseaming a slab or ingot to eliminate therefrom surface defects.

According to the present invention there is provided an apparatus, for use in the treatment of the surface of partly-finished products with a torch, for example for deseaming or descaling of slabs, ingots or other similar metallurgical products with a torch in order to eliminate therefrom surface defects, and of the type in which one or more torches and the product to be treated are movable relative to one another, said apparatus comprising a feeler arrangement in which the torch or torches are supported, the feeler arrangement including a feeler member adapted to move over the surface to be treated, and wherein said feeler arrangement is connected to means capable of continuously adjusting the pressure with which the feeler member bears on the surface to be treated to a predetermined value in such manner that the feeler member can follow the inequalities of the surface of a partly-finished product being treated.

With the apparatus of the invention, it is possible to adjust the pressure of the feeler member to a very low value so that there is no danger of an automatic deseaming process leaving untreated traces on the product or of the product undergoing considerable mechanical stresses which might result in deterioration of the surface thereof.

Advantageously, the feeler arrangement consists of a frame pivotally connected to the rod of a piston of a hydraulic or pneumatic jack, the operating chamber of which is adapted to be placed in communication with an individual source of a driving fluid maintained at a predetermined pressure which corresponds to the desired feeling pressure. This pressure may be adjusted in such manner that the feeler device moves without great resistance over the product to be treated, while being able to follow all the inequalities present on the surface of the product.

In a preferred embodiment, the operating chamber of the jack is connected to a two-way distributor adapted to establish communication between said operating chamber, on the one hand, and either with a general source of supply of driving fluid or with the said individual source of driving fluid on the other hand. In this way, it is possible, at the end of the operating travel, to lift hte piston of the jack and thus to disengage the feeler arrangement from the treated product, thus preventing it from falling heavily at the end of its operating travel.

Mounted in series between the general driving fluid supply source and the two-way distributor there is advantageously a general pressure-reducing valve and a lubricator, and optionally a non-return valve. By means of the said pressure-reducing valve, it is possible to adjust the pressure of the driving fluid to a value at which the piston of the jack can be lifted, and the feeler arrangement can thus be disengaged from the product to be treated, while the said pressure-reducing valve also enables a plurality of hydraulic jacks in a multiple installation to be controlled at the same pressure.

In accordance with a further embodiment of the invention, the individual source of driving fluid is connected to a second duct which connects the two-way distributor to the general source of driving fluid and in which there is provided, upstream of the individual source of driving fluid, a separate pressure-reducing valve, a lubricator and an electromagnetic valve, and downstream thereof, a pressure-operated contact member controlling the electromagnetic valve and a drain valve. With this arrangement, it is possible to maintain the driving fluid contained in the individual source under a predetermined constant pressure, either by supplying it through the individual pressure-reducing valve or by the draining action, the precise control of the pressure obtaining in the individual fluid driving source enabling a constant pressure of the feeler member on the product to be treated to be maintained.

For a better understanding of the invention, and to show how the same may be carried into effect, reference will now be made, by way of example, to the acompanying drawings in which.

Figure 1:
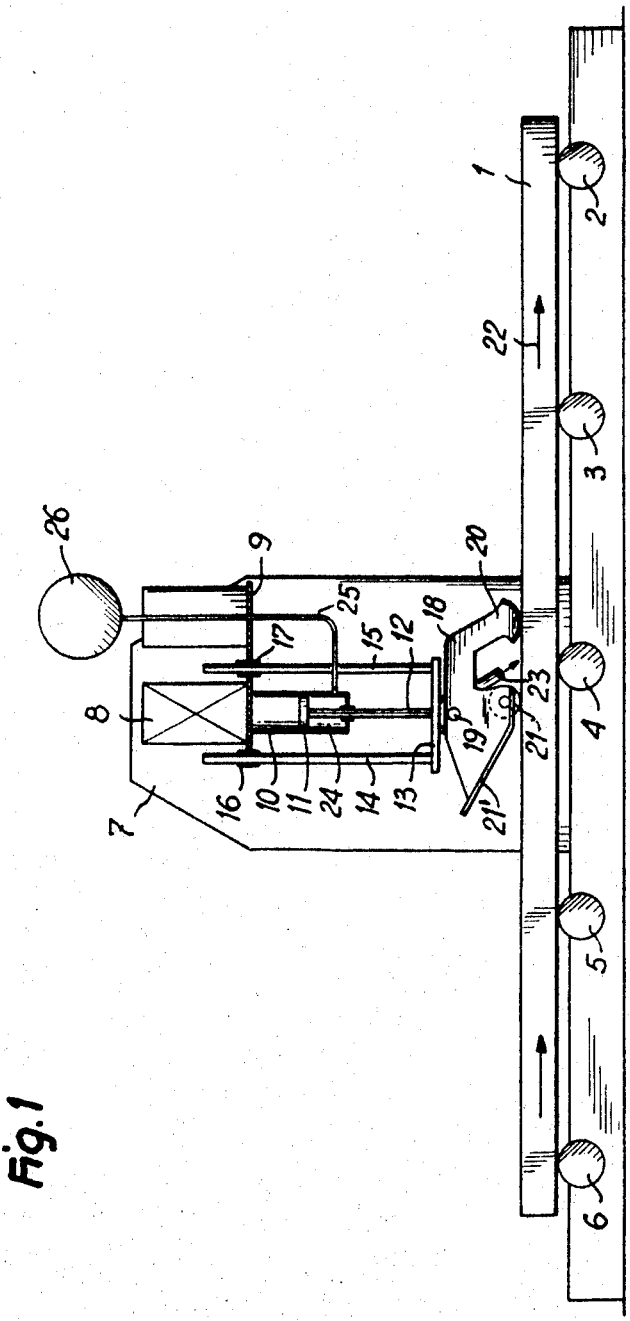
FIGURE 1 is a diagrammatic illustration of the feeler device.

Referring first to FIGURE 1, there is shown a semi-finished product in the form of a slab 1. This slab travels along a horizontal roller conveyor comprising rollers 2, 3, 4, 5 and 6. The slab moves between two fixed side plates 7, only one of which is shown in FIGURE 1. The two side plates 7 are connected together by a cross-member 8 which supports on its lower face a plate 9 to which there is secured a jack 10. The jack comprises a cylinder in which there is movably mounted a piston 11 formed with a piston rod 12, to the free end of which there is secured a cross member 13. Secured to the cross member 13 are two bars 14 and 15 which are adapted to slide in bearings 16 and 17 supported by the plate 9.

The cross member 13 supports on its lower face a feeler arrangement comprising a frame 18 pivotally mounted on a horizontal pin 19 and provided with a front shoe 21' and a rear shoe 20. The frame supports a roller 21 mounted on a horizontal axle below and slightly behind pin 19 with respect to the direction of movement of the slab 1, which is indicated by the arrow 22. The frame also supports a burner, or torch, 23.

The operating chamber 24 of the jack communicates through a duct 25 with a driving fluid source 26.

From the mechanical viewpoint, it will be seen that when the slab 1 moves in the direction of the arrow 22, the frame 18 can move vertically and rock about the pin 19 in accordance with the irregularities of the surface of the slab 1 which is to be treated with the torch 23. In addition, if a driving fluid, under a pre-set pressure, is introduced into the operating chamber 24 of the jack 10, there may be obtained a mode of operation in which the pressure of the elements carried by the frame, which are in contact with the surface to be worked, is relatively low in order to minimise the frictional forces and the wear on the mechanical device.

It is to be noted that in this construction the feeler device is "suspended" by means of the jack 10.

Figure 2:
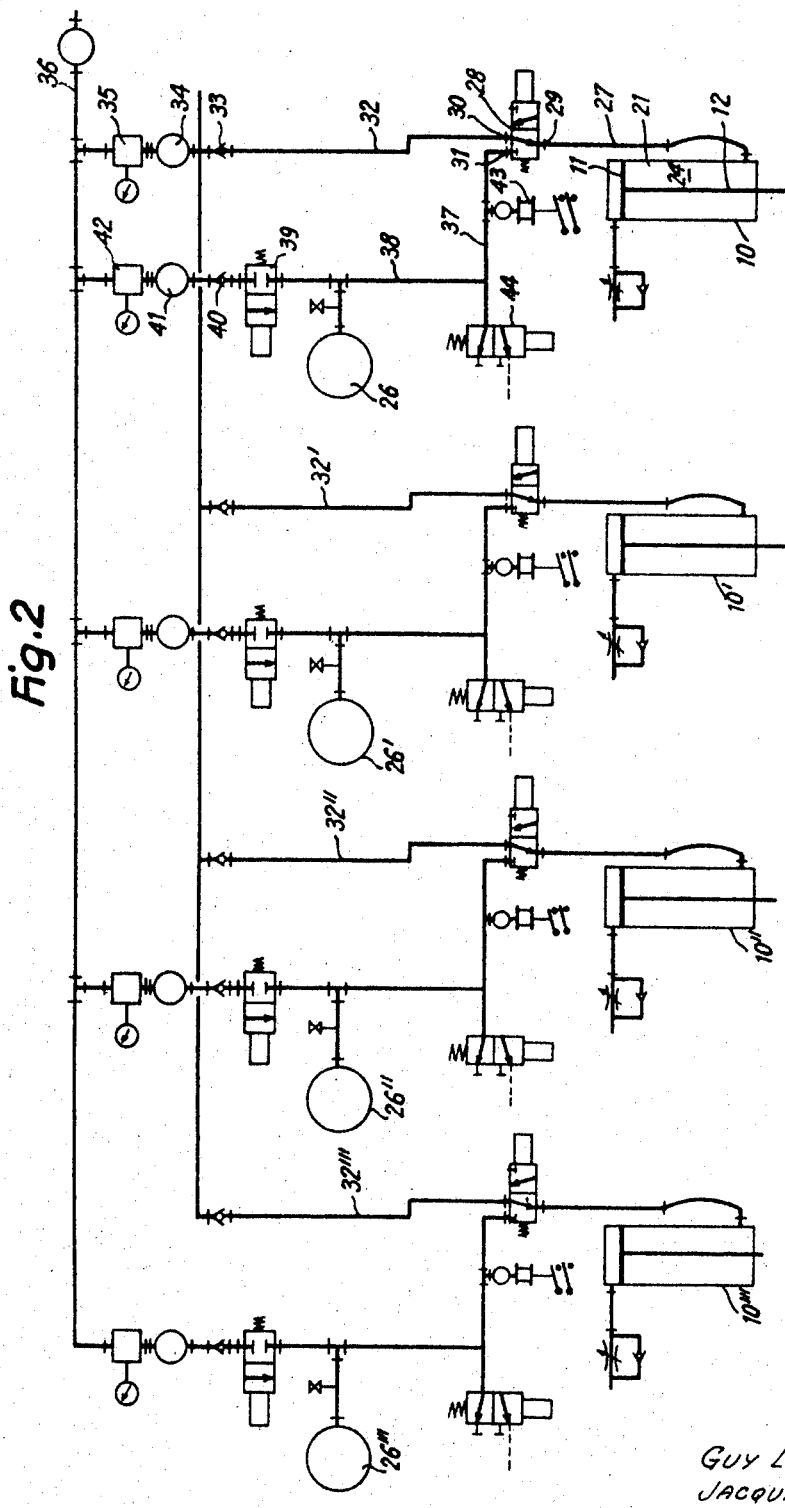
FIGURE 2 is a schematic diagram illustrating the distribution and the control of the driving fluid.

Referring now to FIGURE 2, there is shown schematically the supply of driving fluid to an installation comprising a number of apparatus as shown in FIGURE 1. Each apparatus of the installation is identical and therefore the operation of only one of them will be described. In FIGURE 2, there is shown the jack 10 comprising the cylinder in which there is slidably mounted the piston 11 formed with the piston rod 12, which is provided with the feeler arrangement (not shown in FIGURE 2) at its free end. The operating chamber 24 of the jack 10 is connected through a duct 27 to a two-way distributor 28 provided with a number of pipe unions 29, 30 and 31.

The pipe union 30 is connected through a duct 32, by way of a non-return valve 33, a lubricator 34 and a main pressure-reducing valve 35, to a general driving fluid supply source, which may be, for example, the general compressed-air supply system of the user, denoted by the reference 36.

The second pipe union 31 of the distributor 28 is connected through ducts 37 and 38, an electromagnetic valve 39, a non-return valve 40, a lubricator 41 and an individual pressure-reducing valve 42 associated with the jack 10, to the driving-fluid source 36. Connected to the duct 38 is the individual driving fluid source 26 associated with the jack 10. Connected to the duct 37 is a pressure-operated contact member 43 which controls on the one hand the valve 39 and on the other hand a valve 44 for discharge into atmosphere.

The system described above operates as follows:

Assuming that initially the parts are in the positions shown in FIGURE 2, the two-way distributor 28 connects the operating chamber 24 of the jack to the general driving-fluid supply source 36 through the non-return valve 33, the lubricator 34 and the pressure-reducing valve 35. In this position, the piston of the jack is situated at the end of its upper stroke and the feeler arrangement is disengaged from the part to be treated; it is in the inoperative position.

The pressure in the operating chamber 24 of the jack 10 is that which has been set by means of the pressure-reducing valve 35, and will be referred to as the pressure $D_1$.

In order to bring the feeler arrangement into its operating position, the position of the two-way distributor 28 is reversed, so as to interrupt the communication between the pipe unions 29 and 30 and to establish communication between the pipe unions 29 and 31. When the two-way distributor is in this position, the operating chamber 24 of the jack 10 is connected through the ducts 37 and 38 to the individual driving-fluid source 26, in which there has previously been stored compressed air from the main source 36, through the pressure-reducing valve 42, the lubricator 41, the non-return valve 40 and the valve 39.

When connection is established between the operating chamber 24 and the individual pressurised-fluid source 26 in which the pressure has been set by means of the pressure-reducing valve 42 to a value $d_1'$ which is lower than $D_1$, a state of equilibrium is established as a function of the pressures and of the volumes, which permits lowering of the piston 11 to bring the feeler arrangement to its operative position with a predetermined application pressure, taking into account the weight of the movable assembly of the feeler arrangement.

Under the action of the pressure which is set up in the operating chamber 24 of the jack 10, which is then supplied by the individual source 26, the feeler arrangement bears on the product to be treated and follows all the irregularities which may be present on the surface with which it is in contact. During the treatment and in accordance with these irregularities, the feeler arrangement undergoes upward and downward movements, the result of which is to modify the volume of the operating chamber 24. At each instant, substantially the same pressure is maintained in the said chamber by reason of its communication with the separate source 26.

If, in the course of the operation of the apparatus, the pressure in the reservoir 26, which was initially adjusted to the value $d_1'$, falls below a predetermined value, the pressure-operated contact member 43 immediately opens the valve 39 for resupplying the individual driving fluid source 26; this same pressure-operated contact member 43 interrupts this supply as soon as the pressure $d_1'$ is restored in the individual source 26. On the other hand, if the pressure in the reservoir 26 exceeds the pre-set value $d_1'$, the pressure-operated contact member 43 opens the discharge valve 44, which exhausts the individual driving fluid source 26 into the atmosphere; the pressure-operated member contact 43 closes the discharge valve 44, which is equivalent to a drain, as soon as the desired pressure condition is established in the reservoir 26.

Due to this device for controlling the pressure obtaining in the operating chamber 24, it is ensured that the feeler arrangement bears on the product to be treated with a predetermined pressure and that the burner 23 is always at the same distance from the surface to be treated.

It will be noted from the foregoing description of this control apparatus that, in the operative position, the operating chamber 24 of the jack 10 is supplied by the individual source 26.

In FIGURE 2, there are shown four operating stations whose jacks are denoted by the references 10, 10', 10" and 10'''.

The arrangement for controlling these three other jacks are identical to that for controlling the jack 10. However, it is to be noted that the general source 36 supplies driving fluid through the single pressure-reducing valve 35 and the lubricator 34 common to all the ducts 32', 32", 32''', by which the feeler arrangements are brought into their inoperative positions. In addition, there corresponds to each individual source 26', 26" and 26''' reduction valves and lubricators, as also other associated members.

The apparatus of the invention has just been described as applied to the treatment of surfaces of semi-finished metallurgical products, more particularly for removing surface faults. It is to be understood that the apparatus, including the devices for the control of its suspension, are much more widely applicable. It is also to be noted that the apparatus diagrammatically illustrated in FIGURE 1 as fixed mechanism under which the product to be treated travels may be constructed in the form of a movable apparatus and in this case it is the product to be treated which will remain fixed. It will also be appreciated that the apparatus and the product to be treated may move simultaneously either in the same direction but at different speeds, or in opposite directions to one another.

What we claim is:

1. Apparatus for surface-treating partly finished products with flame, comprising a frame, at least one torch carried by the frame, a holder for guiding said frame, a feeler member carried by the frame to contact a workpiece to be treated with the flame from the torch, fluid pressure means acting on the frame to regulate the pressure with which the feeler bears against a workpiece to be treated and comprising a fluid-operated jack having a cylinder and a piston and a piston rod, one of said cylinder and piston rod being connected to said holder and the other of said cylinder and piston rod being connected to said frame, first and second sources of pressurized driving fluid, and means for selectively individually connecting said sources to said jack to relieve at least a portion of the pressure of said feeler member on a workpiece.

2. Apparatus as claimed in claim 1, said piston rod being pivotally interconnected with said frame, said feeler member being rigid with said frame.

3. Apparatus as claimed in claim 1, both of said sources of pressurized driving fluid being connectable to the same side of said jack.

4. Apparatus as claimed in claim 1, and means for maintaining the pressure of said first source higher than the pressure of said second source.

5. Apparatus as claimed in claim 4, and a pressure-reducing valve interconnecting said first source and said jack.

6. Apparatus as claimed in claim 4, and a pressure-reducing valve interconnecting said first and second sources, said second source comprising a pressure reservoir.

7. Apparatus as claimed in claim 4, and a discharge valve connected between said second source and the atmosphere, and means for opening said discharge valve when the pressure in said second source rises above a predetermined value.

References Cited

UNITED STATES PATENTS

| | | | |
|---|---|---|---|
| 2,500,245 | 3/1950 | Doyle | 148—9.5 |
| 3,032,328 | 5/1962 | Peterson et al. | 266—23 |

FOREIGN PATENTS 822,516 11/1951 Germany.

J. SPENCER OVERHOLSER, Primary Examiner

ROBERT D. BALDWIN, Assistant Examiner

U.S. Cl. X.R.

33—18